United States Patent [19]

Warren

[11] 3,744,696

[45] July 10, 1973

[54] RECORDING WEB GUIDE APPARATUS

[75] Inventor: Henry Ray Warren, Indianapolis, Ind.

[73] Assignee: RCA Corporation, New York, N.Y.

[22] Filed: Oct. 15, 1971

[21] Appl. No.: 189,531

[52] U.S. Cl. .................................. 226/181, 226/196

[51] Int. Cl. .................................. B65h 23/04

[58] Field of Search .................... 226/196, 198, 199, 226/5, 181, 183

[56] References Cited

UNITED STATES PATENTS

| | | | |
|---|---|---|---|
| 3,322,360 | 5/1967 | Roys | 226/199 X |
| 3,462,057 | 8/1969 | Yamamoto | 226/196 X |
| 3,543,983 | 12/1970 | Dale | 226/196 X |

*Primary Examiner*—Allen N. Knowles

*Attorney*—Edward J. Norton and James B. Hayes

[57] ABSTRACT

A device for controlling the path of a recording web with respect to a pinch roller-capstan drive arrangement to minimize contact of the web with the periphery of the pinch roller.

6 Claims, 4 Drawing Figures

INVENTOR.
HENRY RAY WARREN
BY James B. Hayes
ATTORNEY

RECORDING WEB GUIDE APPARATUS

This invention relates to apparatus for guiding a recording web for cooperative relation with a web advancing capstan and rotatable pinch roller. More particularly there is disclosed a tape guiding arrangement, wherein contact between the recording web and the pinch roller is reduced to minimize undesirable travel variations of the recording web.

In existing recorder-reproducer systems, and in particular, in video recording and playback systems, it is necessary to provide precise control of the recording web or tape which travels at appreciable velocity past a signal transducer. Even small variations of the tape velocity or path produce unwanted signal distortions. For advancing the recording web or tape in such systems, it is common practice to have a rotatable pinch roller engage a portion of the web and press it firmly into contact with a rotatably driven capstan. The pinch roller typically is a cylindrical element formed of rubber or a similar pliable material which is mounted for rotation by the capstan. It is difficult and not always economically feasible, to provide a rotatable pinch roller having exact geometry and precise rotation. Disposing the tape or web about and in contact with a roller which may exhibit excentricity, variations in size, or non-uniform rotation can result in undesirable travel variation. In addition the path of the recording web must be controlled. These requirements must be satisfied within close confines, particularly where the recording web and pinch roller form a portion of an interchangeable tape cartridge.

Such problems of driving and guiding the recording web with minimal travel variation are provided simply, economically and in a minimal space with the present invention.

Briefly, in accordance with the invention, there is provided a pinch roller including a substantially cylindrical peripheral surface. The roller is rotatable about a given axis and arranged in cooperative relation with capstan means for advancing an elongated recording web of given width therebetween. A guiding device for the web comprises a stationary member having an arcuate surface adapted to have the web pass thereover, with the surface extending partially about and in spaced relation with the peripheral surface of the pinch roller. The arcuate surface is arranged with respect to the path of the web to support the web in spaced relation to the pinch roller, except at the area of cooperation of the capstan means and the pinch roller.

Figure 1A:
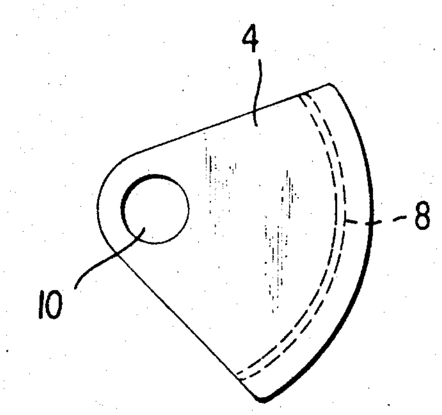
Figure 1B:
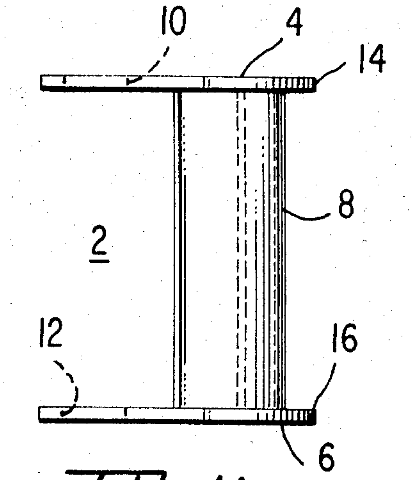

FIG. 1 (*a*) and (*b*) are a plan view and side view respectively of an embodiment of the invention.

Figure 2A:
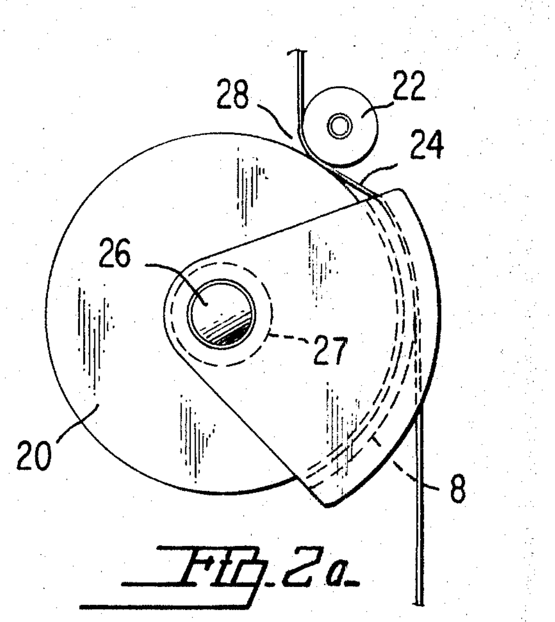
Figure 2B:
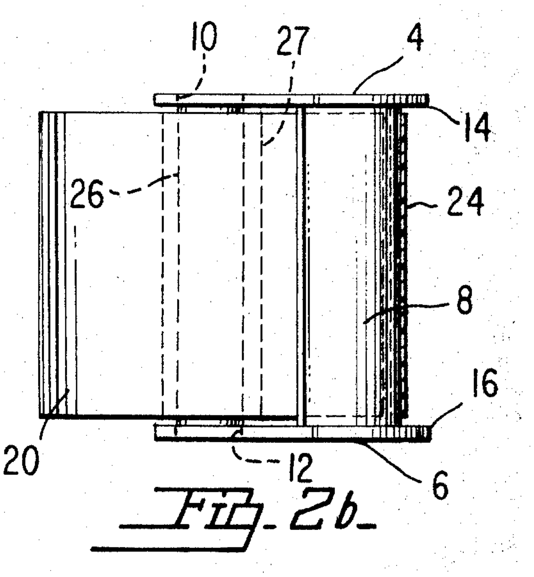

FIG. 2 (*a*) and (*b*) are respectively a further plan view and side view of the embodiment of FIG. 1.

FIG. 1 shows a generally U-shaped member 2 including substantially parallel planar end portions 4 and 6, with an arcuate surface 8 extending therebetween and interconnecting the end portions 4 and 6. The member 2 in the embodiment shown, may be thought of as a sector of a hollow right circular cylinder, with the peripheral surface 8 disposed between planar end portions 4 and 6 which are substantially normal to the axis of the cylinder. Each of the end portions 4 and 6 have holes 10 and 12 with substantially aligned centers, for mounting the member 2 in a manner hereinafter described. The end portions 4 and 6 are spaced from one another by at least the width of the particular recording web it is desired to drive and guide. As shown in the drawing there are provided elements 14 and 16 which project beyond the surface 8 to provide edge guiding of the web adjacent each side of the recording web path over the surface 8. The elements 14 and 16 are not essential and therefore for certain applications are preferably deleted. Where the member 2 for example is formed of a single piece, the edge guide elements 14 and 16 can be provided by flaring the side edges of the surface 8 at the interface with the end portions 4 and 6. If the member 2 however is formed of separate pieces, the surface 8 may for example be secured in recessed manner with respect to the arcuate edges of the end portions 4 and 6, to form projections or flanges 14 and 16 which extend beyond the surface 8 for edge guiding the web. In practice of the invention the member 2 may be formed of a suitable metal and/or plastic material, which facilitates smooth transfer of the recording web thereover.

In FIG. 2 there is shown an illustrative arrangement of the cooperative relation of the member 2 with a pinch roller 20, capstan means 22 and the path of a recording web 24. In FIG. 2 the capstan means 22 is rotatably driven in conventional manner by means not shown. The pinch roller 20, which is preferably cylindrical, is mounted for rotation about a fixed shaft 26 by means such as a bearing 27. The shaft 26 is arranged to cause the periphery of the pinch roller 20 to urge the web 24 in cooperative advancing relation with capstan means 22. Such arrangements are well known, such as mounting the pinch roller on a pivotal arm which is spring biased toward the capstan. The stationary guide member 2 is secured about the fixed shaft 26 by means of the holes 10 and 12 in the end portions 4 and 6 thereof, with the surface 8 extending about and in spaced relation with a portion of the peripheral surface of the pinch roller 20. The stationary guide member 2 is positioned about the periphery of the pinch roller 20 in spaced relation to the area or point 28 of cooperation of pinch roller 20 and capstan means 22. As shown in FIG. 2, the arcuate guide surface 8 is disposed with respect to the path of the web 24, in a manner which supports the web 24 in spaced relation to the periphery of the pinch roller 20, except at the area of cooperation 28 of the capstan means 20 and the roller 20.

With the present arrangement, contact between the recording medium 24 and the roller 20 is provided only at the necessary area of cooperation with the capstan means 20. This limited contact between the web 24 and peripheral surface 20 of the roller, minimizes the effects on web travel due to the previously mentioned factors such as eccentricity, size and rotation variation, sometimes generally referred to as "run-out" of the pinch roller 20. Thus the recording web is supported, guided and provided with improved stability, with only little additional space being utilized beyond that required in existing web drive systems employing a pinch roller and a capstan.

What is claimed is:

1. In an apparatus including a pinch roller having a substantially cylindrical peripheral surface, said roller being rotatable about a given axis and arranged in cooperative relation with capstan means for advancing an elongated recording web of given width therebetween, a guiding device for said web comprising; a stationary member defining in conjunction with said capstan a desired normal operating path for said web, said stationary member having an arcute surface adapted to have each successive web portion always pass thereover as said web traverses said normal operating path, said arcuate surface extending partially about and spaced at all points from the peripheral surface of said pinch roller, said arcuate surface being arranged to support said web in spaced relation to said pinch roller except at the area of cooperation of said capstan means and said pinch roller.

2. The invention according to claim 1, wherein the arcuate surface of said member is concentric with the axis of rotation of said pinch roller.

3. The invention according to claim 1, and further including means for fixedly securing said member to the rotation axis of said pinch roller.

4. The invention according to claim 1, wherein said arcuate surface extends a distance in the direction substantially parallel to the rotation axis of said pinch roller which is at least equal to the width of said recording web, and further including a pair of flanges disposed on said surface and facing away from said pinch roller, said flanges extending along the arc of said surface in substantially parallel spaced relation for edge guiding said recording web over said surface.

5. The invention according to claim 1, wherein; said member comprises a generally U-shaped element having the shape of a sector of a hollow right circular cylinder of given diameter including planar end portions substantially normal to the axis of said cylinder, said pinch roller having a diameter less than said given diameter, and means mounting said roller for coaxial rotation about the cylinder axis of said member.

6. The invention according to claim 5, wherein said planar end portions of said member are separated by substantially the width of said recording web with said end portions including flared portions extending radially outward to guide said web over the cylindrically peripheral surface of said member.

* * * * *